United States Patent
Doumuki

(10) Patent No.: US 7,809,812 B2
(45) Date of Patent: Oct. 5, 2010

(54) SYSTEM AND METHOD FOR NETWORK SETUP OF WIRELESS DEVICE AT POINT OF SALE

(75) Inventor: Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 768 days.

(21) Appl. No.: 11/818,770

(22) Filed: Jun. 15, 2007

(65) Prior Publication Data

US 2008/0313448 A1    Dec. 18, 2008

(51) Int. Cl.
*G06F 21/20*    (2006.01)
(52) U.S. Cl. .................. 709/222; 709/202; 709/238; 709/229; 709/220; 713/1; 713/169; 370/352; 370/392; 370/310; 370/341; 370/349
(58) Field of Classification Search .................. 709/220, 709/201, 222, 238, 229, 228
See application file for complete search history.

(56) References Cited

U.S. PATENT DOCUMENTS

| | | | |
|---|---|---|---|
| 6,704,401 B2 | 3/2004 | Piepho et al. ............ 379/90.01 |
| 2004/0168081 A1 | 8/2004 | Ladas et al. | |
| 2004/0242197 A1 | 12/2004 | Fontaine | |
| 2005/0025103 A1 | 2/2005 | Ko et al. | |
| 2005/0086328 A1 | 4/2005 | Landram .................... 709/200 |
| 2005/0239445 A1 | 10/2005 | Karaoguz et al. | |
| 2005/0277412 A1 | 12/2005 | Anderson ................ 455/435.1 |
| 2006/0080441 A1 | 4/2006 | Chen et al. | |
| 2006/0184998 A1 | 8/2006 | Smith et al. | |
| 2006/0251256 A1* | 11/2006 | Asokan et al. .............. 380/270 |
| 2006/0271690 A1 | 11/2006 | Banga et al. | |
| 2007/0019609 A1* | 1/2007 | Anjum ....................... 370/349 |
| 2007/0156436 A1* | 7/2007 | Fisher et al. ................... 705/1 |
| 2008/0195736 A1 | 8/2008 | Sekiya | |
| 2009/0043871 A1 | 2/2009 | Doumuki | |
| 2009/0043998 A1 | 2/2009 | Doumuki | |

FOREIGN PATENT DOCUMENTS

EP        1 487 224        12/2004

OTHER PUBLICATIONS

Denis Chalon, Yves Durand, Bruno Richard: "An Overview of Automatic Network Configuration for IPv4 Appliances" HP Laboratories Grenoble, Sep. 28, 2001.
Günter Obiltschinig, "Automatic Configuration and Service Discovery for Network Smart Devices" Electronica Embedded Conference Munich 2006.
N. Sriskanthan, D. Tandon, K.K. Lee, "Protocol for plug and play in Bluetooth based home networks" Consumer Electronics, IEEE Transactions on May 2004, vol. 50 No. 2, pp. 457-462.

(Continued)

*Primary Examiner*—Jude J Jean Gilles
(74) *Attorney, Agent, or Firm*—John L. Rogitz

(57) ABSTRACT

A network device such as a wireless network device is configured using information obtained at the point of sale (POS) for a specific home network to which the device will belong. This may be accomplished by obtaining from the buyer at the POS account information, which is sent to a configuration server that automatically sets up the device for network use without the buyer's further direct involvement.

17 Claims, 3 Drawing Sheets

OTHER PUBLICATIONS

IEEE, "Information Technology—Part 11: Wireless LAN Medium Access Control and Physical Layer specifications" IEEE std 802, Nov. 1997. Jun. 26, 1997, pp. 62-65.

Doumuki, Tohru; "System and Method for Network Setup of Wireless Device Through a Single Interface", co-pending U.S. Appl. No. 11/834,128, filed Aug. 6, 2007 (1168.261).

Doumuki, Tohru; "System and Method for Setup of Wireless Device for Home Network", co-pending U.S. Appl. No. 11/834,158, filed Aug. 6, 2007 (1168.259).

Tohru Doumuki, "System and Method for Network Setup of Wireless Device for Home Network", Office Action dated Dec. 14, 2009 in co-pending U.S. Appl. No. 11/834,158, filed Aug. 6, 2007 (1168.259).

\* cited by examiner

SYSTEM AND METHOD FOR NETWORK SETUP OF WIRELESS DEVICE AT POINT OF SALE

FIELD OF THE INVENTION

The present invention relates generally to systems and methods for the network set-up of wireless devices at the point of sale of the devices.

BACKGROUND OF THE INVENTION

As network technologies are being adopted in consumer electronics (CE) products such as digital TVs, video recorders, digital still/video cameras, other wireless digital CE devices, etc. to enable these devices to communicate with other like devices in a home network, the network setup process becomes an obstacle for ease of use in these products. This is essentially because network setup is a computer-oriented procedure, which is cumbersome and unfamiliar to most non-technical users.

For example, even when a home has wireless network installed, each time a user adds a new wireless device, the user must undertake the cumbersome setup process to input network configuration. This typically includes typing in network ID and password, sometimes referred to as a service set identifier (SSID) and wired equivalent piracy (WEP) keys, respectively. Although this may be a common process for a PC-based network, as understood herein the following issues arise when the same process is applied to CE products.

A user must have knowledge about the nature and location of network configuration information (e.g., SSID and WEP keys) that is required, as well as knowing when and how to input the information. Also, each network product must have an input/output device such as a keypad to type in the necessary information and to display confirmation. Providing such I/O devices, however, is not practical for many CE products. Moreover, because the user interface or setup menu typically varies from product to product, a non-technical user can become further confused.

Accordingly, with the above in mind users frequently encounter difficulty in connecting new devices to their home networks. As recognized herein, when a user has difficulty completing the setup process, the user typically calls customer support of the manufacturer for assistance. This, however, does not guarantee ease in identifying the cause of the difficulty so that a solution can be quickly provided over the phone, and moreover customer support is costly.

SUMMARY OF THE INVENTION

The present invention configures a network device such as a wireless network device at the point of sale (POS) for a specific home network to which the device will belong. This may be accomplished by obtaining from the buyer at the POS account information, which is sent to a configuration server that automatically sets up the device for network use without the buyer's further direct involvement. In this way, manufacturers as well as users benefit, since the cost of customer support associated with user-conducted setup is eliminated. Moreover, a sales model is provided by which a network device is automatically configured at the point of sales, thus also providing a benefit to retailers as it is regarded as an additional service and value.

Accordingly, a method for configuring a network device for a network includes, at a point of sale of the device, receiving a device identification (ID) unique to the device and providing the device ID to an Internet server. The method further includes sending the device ID from the server to a network component in the network, using the device ID as a temporary network ID to establish communication between the component and the device, and sending a main network ID from the component to the device. The main network ID subsequently is used in communication between the device and the network.

In some implementations the device is a wireless device, the temporary network ID is a service set identifier (SSID), and the main network ID is a SSID. In non-limiting implementations the main network ID is for a main channel and initially is sent to the device on a subchannel using the temporary network ID. If desired, the subchannel can be deactivated after communication is established with the device using the main network ID. The method can also include deriving a password such as a wired equivalent piracy (WEP) key as a function of the device ID.

In another aspect, a network device associated with a unique device ID executes logic that includes using the device ID as a network ID to obtain a main network ID over a subchannel of a home network. The device sets the device ID to be the main network ID and then subsequently communicates with a main channel of the home network using the main network ID.

In still another aspect, a system includes means for providing a device ID unique to a network device at a point of sale of the network device. The system also includes means for providing the device ID to a home network, and means for communicating a main network ID to the device over the home network using the device ID as a temporary network ID. Means are provided for subsequently using the main network ID to establish communication between the device and at least one component on the network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
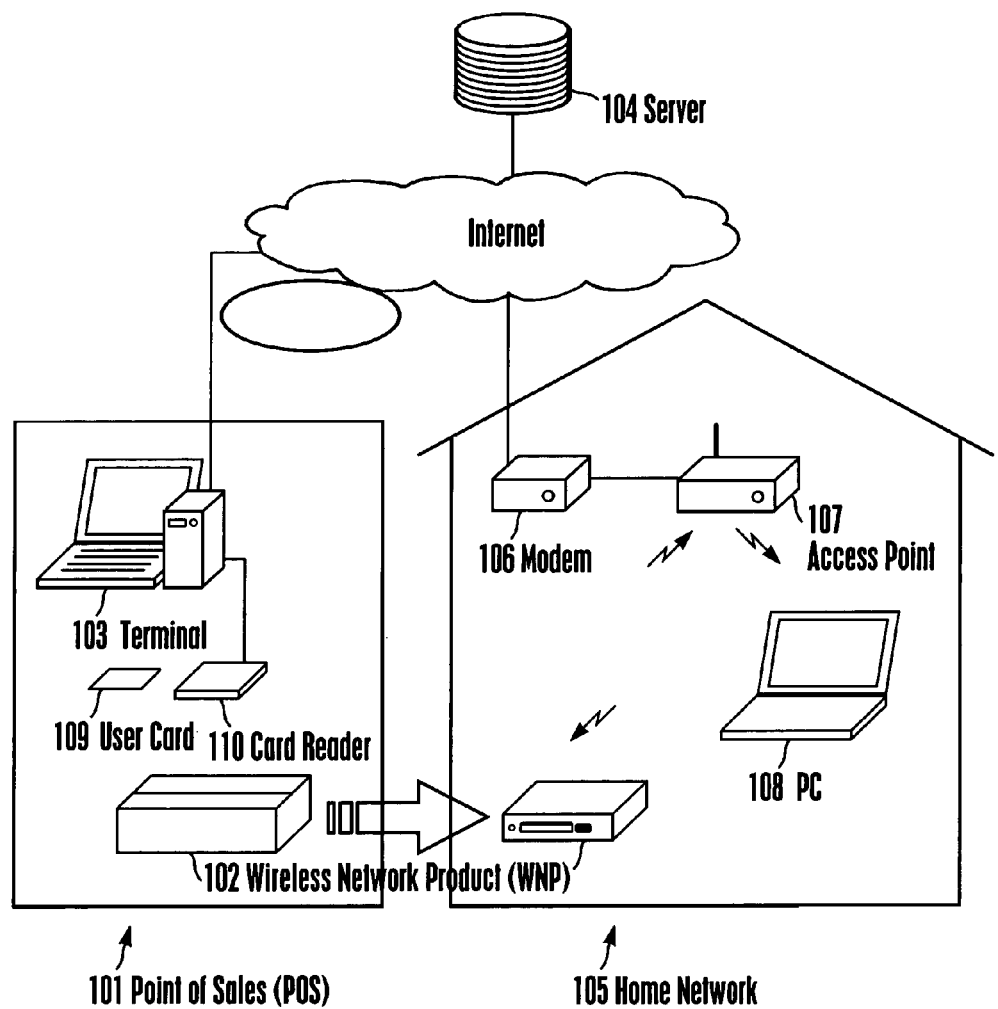
FIG. 1 is a block diagram of a non-limiting system in accordance with present principles.

Referring initially to FIG. 1, a system is shown, generally designated 100, which includes one or more points of sales (POS) 101. A POS 101 can be a retail location or online website at which a user can purchase a digital network device such as a wireless network product (WNP) 102 that may be vended with the below-described device ID stored in it. Without limitation the WNP 102 may be a digital still or video camera, digital music player, wireless digital TV, etc.

As shown in FIG. 1, a computerized retail sales terminal 103 may be used to input data at the POS. Sales information (product type, unique device ID, cost, etc.) as well as user data (credit card number from a card 109 via a card reader 110, name, address, and other registration information) may be input by, e.g., a sales clerk at the terminal 103. In the case of Internet sales, the terminal 103 may be a user's home PC into which the user inputs the sales and registration information. In any case, the terminal 103 communicates data to a server 104 through a network such as the Internet.

FIG. 1 shows that a home network 105, to which the WNP 102 is to belong and/or to be used, communicates with the network using, e.g., a modem 106. As shown, the modem 106 can be connected to the Internet and also to a wireless access point (WAP) 107 to facilitate wireless connection among devices including the WNP 102 in the home network 105. In non-limiting embodiments the WAP 107 has a capability to accommodate two wireless channels (main and subchannel), each of which is specified by SSID and WEP key. In one implementation the SSID of the main channel may be designated "$N_a$", and the WEP key can be calculated by a specific function F(x), which is commonly implemented in the WNP 102 as well.

As shown, a personal computer (PC) 108 or other coordinating server-type device may be provided in the home network 105. The PC 108 preferably has a wireless connection to the WAP 107 via the main channel, and also has access to the server 104 on the Internet through the modem 106. It is to be understood that without limitation the PC 108, server 104, and WNP 102 may have digital processors that execute logic stored on computer-readable media such as disks or solid state media in accordance with the logic of FIG. 2.

A user of the home network 105 is assumed to have an account that may be obtained by registration of some network device and/or for some network service. The server 104 stores the user account information. In the following example, the user account is assumed to be associated with the PC 108 and/or an application executed by it.

Figure 2:
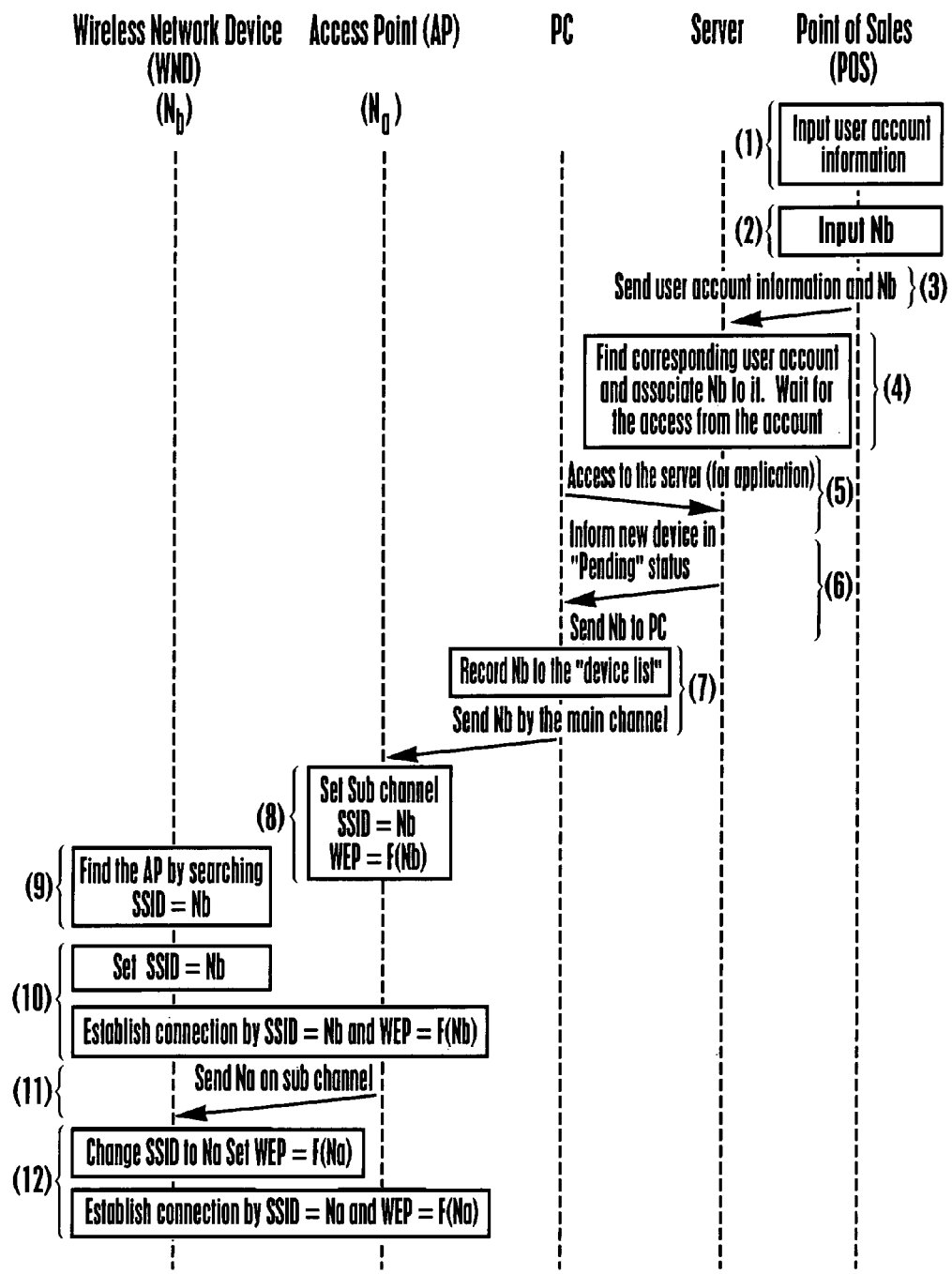
FIG. 2 is a logic chart illustrating non-limiting steps in accordance with present principles.
Figure 2:
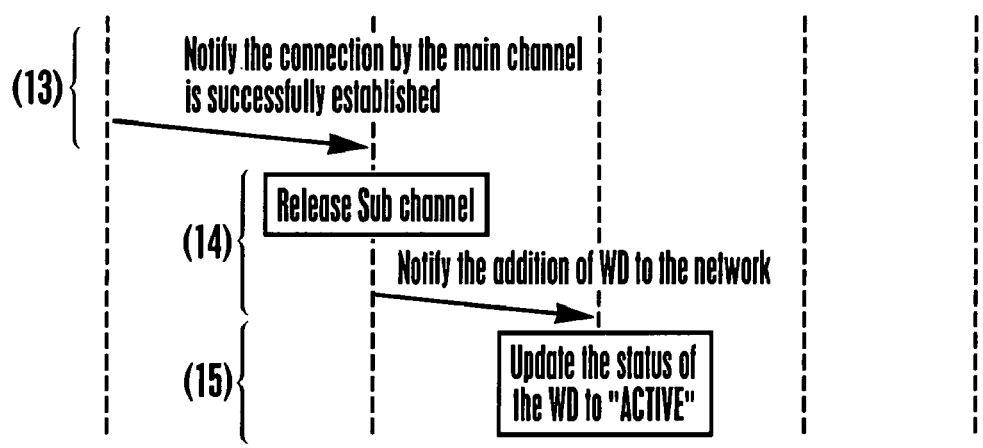

With the above in mind, reference is now made to FIG. 2, which shows a sequence of logic in accordance with present principles. The WNP 102 is vended with an initial temporary device identification designated herein $N_b$, which is unique to each product and which may be in the form of an SSID in, e.g., non-limiting wireless applications.

At step (1), at the POS 101 the user's account information (e.g., account name and password that among other things identify the user's home network) are input to the terminal 103. The account information may be provided by the user directly and input to the terminal 103 manually. Or, the account information may be borne on the user card 109 which can be issued by the manufacture or service provider. The user account information can be recorded on the card 109 on a magnetic strip thereof, or using optical code, IC memory, etc. In this case, the terminal 103 is connected to the card reader 110 to retrieve those data. Alternatively, when the purchase order is placed online, the user may input the account information together with making the purchase.

At step (2), the temporary device ID $N_b$ is also input through the terminal 103. Then, at step (3) the user account information and the temporary device ID $N_b$ are both transferred to the server 104.

Moving to step (4), the server 104 accesses its user account database and to retrieve corresponding data for the account identified by the account information received at step (3), also associating the unique device ID with the corresponding home network. The server 104 adds new data to the account record, specifically that a new device with device ID=$N_b$ is in a pending status for network set up. In other words, the server 104 sets the "device registration status" to "pending", and then waits for the user to access the account.

This access is shown at step (5) of FIG. 2, wherein the user by means of the PC 108 accesses the server with the user account information. In response, at step (6) the server 104 notifies the PC 108 (or equivalently an application running thereon) that a new device is in the setup pending status, with the server delivering the temporary device ID $N_b$ to the PC 108.

At step (7) the PC 108 records the device ID $N_b$ to a registered device list, categorizing it as, e.g., "suspended". The PC 108 also sends the device ID $N_b$ to the WAP 107 preferably using the main channel already established with an SSID=$N_a$.

At step (8), upon receiving the device ID $N_b$, the WAP 107 sets the SSID of the subchannel mentioned above to be equal to the device ID $N_b$, also calculating the subchannel WEP key to be a function of $N_b$. The function used to calculate the WEP key may be a secret function commonly implemented for or by the WAP 107 and WNP 102.

Proceeding to step (9), the WNP 102 searches for the WAP 107 by scanning for access points in accordance with WAP scanning principles known in the art. This may be invoked by the user from a setup menu, or alternatively it may be started automatically when the power is turned on first time by the user. By scanning, the WNP 102 discovers the subchannel with an SSID=$N_b$. Additionally, at step (10) the WNP 102 also sets its SSID to be the device ID $N_b$ and its WEP key to be the above-discussed function of the device ID $N_b$. As a consequence, the WNP 102 can establish a wireless communication connection with the WAP 107 over the subchannel.

With the subchannel communication established, at step (11) the WAP 107 sends the SSID $N_a$ of the main channel to the WNP 102 via the subchannel. Now having the main channel SSID, at step (12) the WNP 102 changes its SSID to be the main channel SSID $N_a$ and also sets its WEP key to be a function of the main channel SSID $N_a$, establishing communication with the WAP 107 through the main channel. In this way, security of the main channel SSID and WEP keys of the home network is preserved.

Completing the logic, at step (13) the WNP 102 sends a message to the WAP 107 to notify the WAP 107 that communication with the WNP 102 is now over the main channel with SSID=$N_a$. Upon receiving the message, at step (14) the WAP 107 deactivates the subchannel and preferably erases the SSID of the subchannel. The WAP 107 then notifies the PC 108 that the WNP 102 is now added to the network and available for communication. If desired, at step (15) the PC 108 can change the status of the WNP 102 in the registered device list from "suspended" to "active".

It may now be appreciated that using the logic of FIG. 2, advantageously the user is requested to do nothing beyond the purchase steps to add a new device to the home network other than to provide user account information at the time of purchase.

It is to be understood that while in the above example the PC accesses the server to learn of the new device, in other implementations the server can push the new device information to the PC without being asked. It is to be further understood that while a wireless network with SSID is described above in the non-limiting illustrative embodiment, the invention is not limited to wireless networks, but can be applied to other types of networks such as powerline or phoneline communication networks. In these cases, network identification ID is used, corresponding to SSID in the case of wireless, and it depends on each network type and can be transferred in the same way as the SSID described above. It is to be further understood that the WAP 107 may be incorporated into the PC 108.

While the particular SYSTEM AND METHOD FOR NETWORK SETUP OF WIRELESS DEVICE AT POINT OF SALE is herein shown and described in detail, it is to be understood that the subject matter which is encompassed by the present invention is limited only by the claims.

What is claimed is:

1. A method for configuring a network device for a network, comprising:
  at a point of sale of the network device, receiving a device identification (ID) unique to the network device;
  providing the device ID to an Internet server;
  sending the device ID from the Internet server to a network component in the network;
  using the device ID as a temporary network ID to establish communication between the network component and the network device;
  sending a main network ID from the network component to the network device; and
  subsequently using the main network ID in communication between the network device and the network, wherein the main network ID is for a main channel and initially is sent to the network device on a subchannel using the temporary network ID.

2. The method of claim 1, wherein the subchannel is deactivated after communication is established with the network device over the main channel.

3. The method of claim 1, wherein the network device is a wireless device, the temporary network ID is a service set identifier (SSID), and the main network ID is a SSID.

4. The method of claim 1, further comprising deriving at least one password as a function of the device ID.

5. The method of claim 4, wherein the password is a wired equivalent piracy (WEP) key.

6. A network device associated with a unique device ID and executing logic comprising:
  using the device ID as a temporary network ID to obtain a main network ID over a subchannel of a home network;
  setting the device ID to be the main network ID;
  establishing communication between the network device and a main channel of the home network; and
  subsequently communicating with the main channel of the home network using the main network ID.

7. The network device of claim 6, wherein the device ID is received at a point of sale of the network device and sent from the point of sale to the home network.

8. The network device of claim 7, wherein the network device is a wireless device and the main network ID is a service set identifier (SSID).

9. The network device of claim 6, wherein the subchannel is deactivated after communication is established with the network device using the main network ID.

10. The network device of claim 6, wherein the network device derives at least one password as a function of the device ID.

11. The network device of claim 10, wherein the password is a wired equivalent piracy (WEP) key.

12. A system, comprising:
  a processor accessing a non-transitory computer readable storage medium to execute logic comprising:
  providing a device ID unique to a network device at a point of sale of the network device;
  providing the device ID to a home network;
  communicating a main network ID to the network device over the home network using the device ID as a temporary network ID; and
  subsequently using the main network ID to establish communication between the network device and at least one component on the network.

13. The system of claim 12, wherein the network device is a wireless device and the main network ID is a SSID.

14. The system of claim 12, wherein the main network ID is for a main channel and initially is sent to the network device on a subchannel using the device ID as a temporary network ID.

15. The system of claim 14, wherein the subchannel is deactivated after communication is established with the device using the main network ID.

16. The system of claim 12, wherein the network device and the network derive at least one password as a function of the device ID.

17. The system of claim 16, wherein the password is a wired equivalent piracy (WEP) key.

* * * * *